(12) United States Patent
Detro

(10) Patent No.: US 6,809,874 B1
(45) Date of Patent: Oct. 26, 2004

(54) PATHLENGTH MATCHED BEAM SPLITTER AND METHOD AND APPARATUS FOR ASSEMBLY

(75) Inventor: Michael Detro, Los Gatos, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 0 days.

(21) Appl. No.: 10/251,225

(22) Filed: Sep. 20, 2002

Related U.S. Application Data

(60) Provisional application No. 60/349,273, filed on Jan. 14, 2002.

(51) Int. Cl.$^7$ .............................................. G02B 27/14
(52) U.S. Cl. ....................................... 359/638; 359/629
(58) Field of Search ........................... 353/101, 34, 37, 353/100; 359/634, 640; 349/9; 348/335–339

(56) References Cited

U.S. PATENT DOCUMENTS

| | | | |
|---|---|---|---|
| 4,544,237 A | | 10/1985 | Gagnon |
| 4,926,249 A | * | 5/1990 | Ichihara et al. .............. 358/511 |
| 5,418,769 A | * | 5/1995 | Inoue ..................... 369/112.28 |
| 5,552,922 A | * | 9/1996 | Magarill ...................... 359/224 |
| 5,786,937 A | | 7/1998 | Chu et al. |
| 5,838,397 A | | 11/1998 | Stephens |
| 5,865,520 A | | 2/1999 | Kavanagh et al. |
| 5,986,814 A | | 11/1999 | Reinsch |
| 6,046,858 A | | 4/2000 | Scott et al. |
| 6,115,484 A | * | 9/2000 | Bowker et al. .............. 382/127 |
| 6,176,586 B1 | | 1/2001 | Hirose et al. |
| 6,183,090 B1 | | 2/2001 | Nakanishi et al. |
| 6,183,091 B1 | | 2/2001 | Johnson et al. |
| 6,262,851 B1 | | 7/2001 | Marshall |
| 6,280,037 B1 | | 8/2001 | Smith |
| 6,288,844 B1 | | 9/2001 | Edlinger et al. |
| 6,304,302 B1 | | 10/2001 | Huang et al. |
| 6,309,071 B1 | | 10/2001 | Huang et al. |
| 6,366,335 B1 | | 4/2002 | Hikmet et al. |
| 6,375,330 B1 | | 4/2002 | Mihalakis |
| 6,407,868 B1 | | 6/2002 | Ishibashi et al. |
| 6,415,093 B1 | | 7/2002 | Nakamura et al. |
| 6,419,362 B1 | | 7/2002 | Ikeda et al. |
| 6,454,416 B2 | | 9/2002 | Aoto et al. |
| 6,476,972 B2 | | 11/2002 | Edlinger et al. |
| 6,490,087 B1 | | 12/2002 | Fulkerson et al. |
| 6,611,379 B2 | * | 8/2003 | Qian et al. ................... 359/618 |
| 2002/0001135 A1 | | 1/2002 | Berman et al. |
| 2002/0109820 A1 | | 8/2002 | Pan |
| 2002/0140905 A1 | | 10/2002 | Ouchi et al. |
| 2002/0176054 A1 | | 11/2002 | Mihalakis |
| 2003/0117593 A1 | | 6/2003 | Abe et al. |
| 2003/0147051 A1 | | 8/2003 | Fujita et al. |

FOREIGN PATENT DOCUMENTS

JP    54-155153    6/1981

\* cited by examiner

*Primary Examiner*—Ricky Mack
(74) *Attorney, Agent, or Firm*—Reed Smith LLP; John W. Carpenter

(57) ABSTRACT

Pathlength matched optical devices (such as beam splitters) are produced by viewing optical paths through the optical devices and adjusting relative positions of optical components of the optical devices until the viewed optical paths are equivalent. The optical paths begin at markings at different locations on the optical device. The optical pathlengths are equivalent when both markings are in focus in a limited field of view camera or lens. In a beam splitting cube constructed of two prisms, markings located at precisely similar locations on different prisms are pathlength matched when coincident as viewed at a reference face of the cube. The prisms are abutted at their diagonals and are adjusted by sliding the prisms along the diagonals to the pathlength matched position. Optical adhesive between the prisms is cured after fixing the prisms at the pathlength matched position.

27 Claims, 4 Drawing Sheets

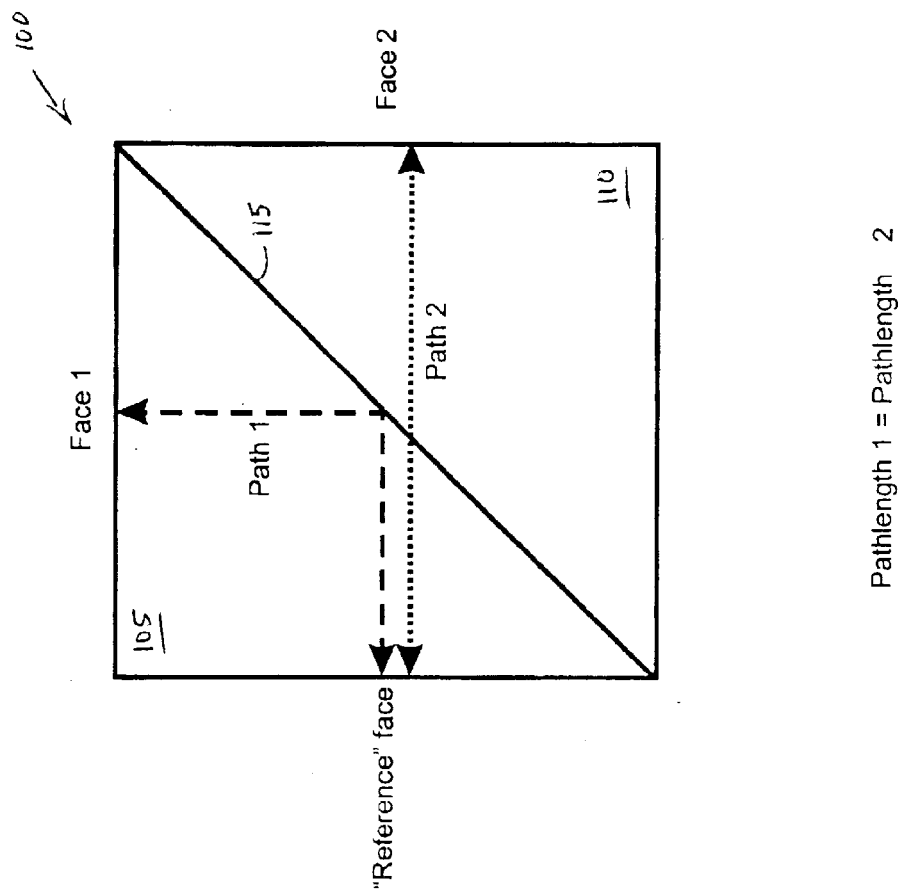

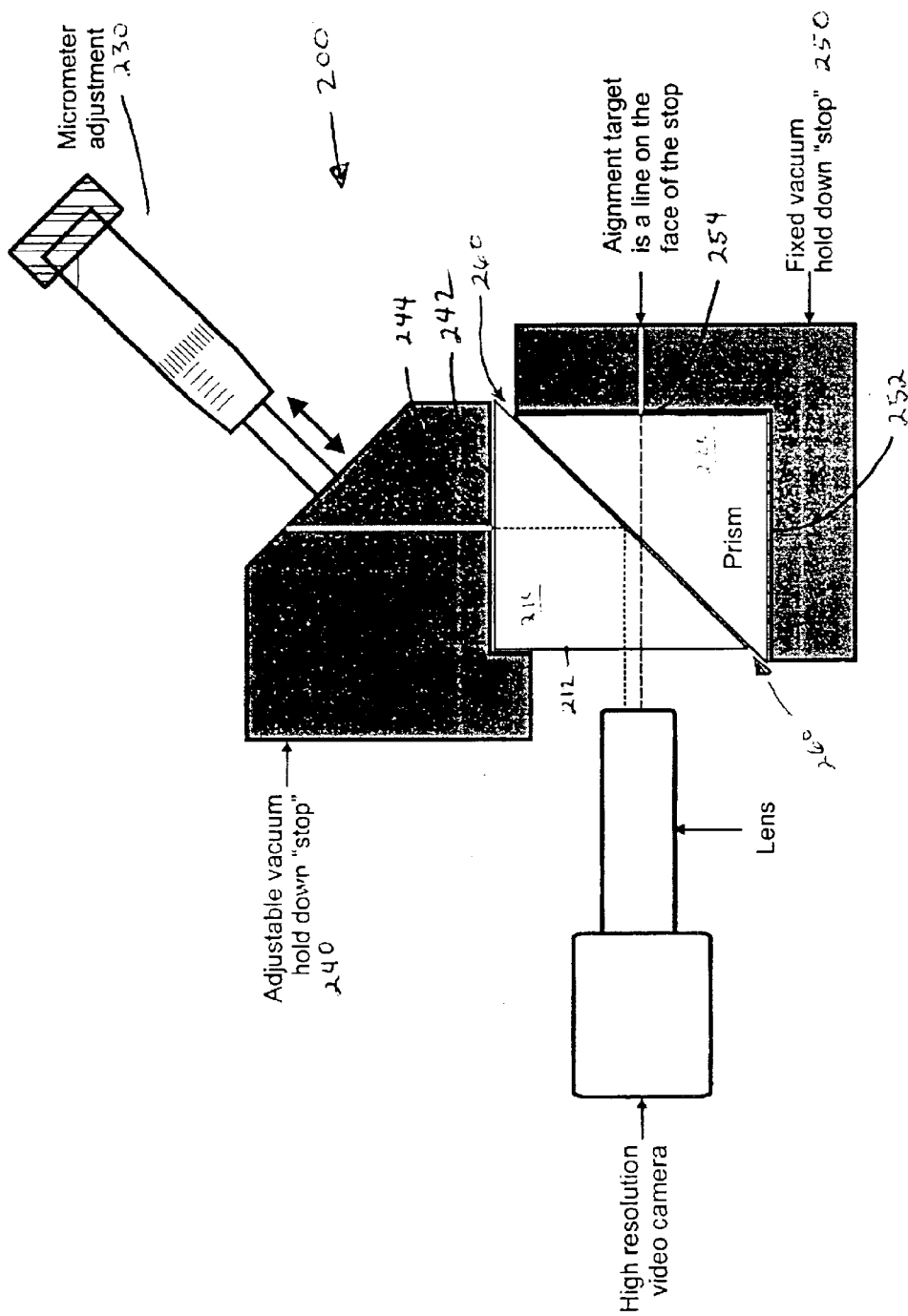
FIGURE #2A: METHOD TO PRODUCE A "PATHLENGTH MATCHED" PBS CUBE
THE POSITION OF THE STOP IS ADJUSTED UNTIL THE ALIGNMENT TARGETS ARE COINCIDENT

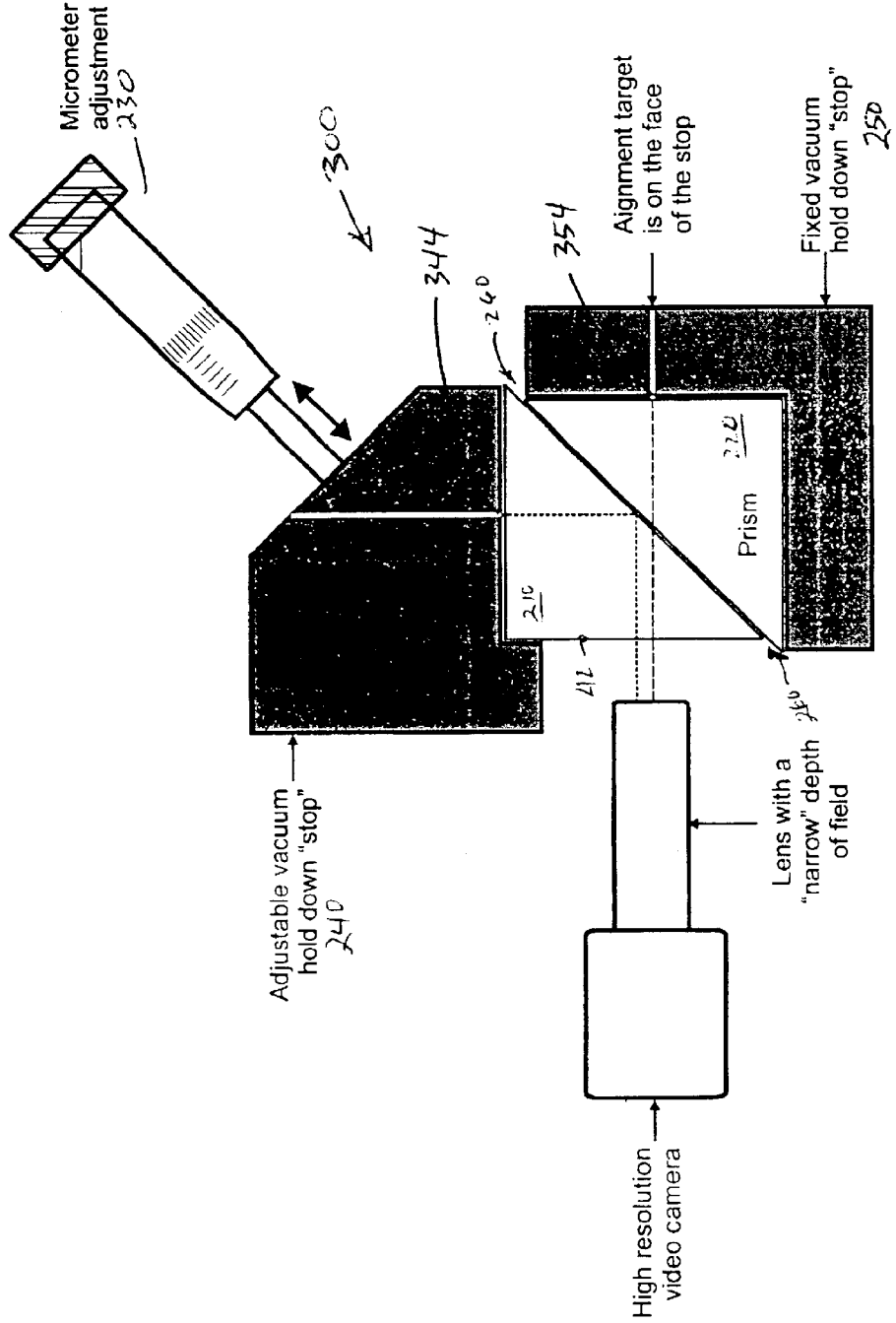
FIGURE #3: A METHOD TO PRODUCE A "PATHLENGTH MATCHED" PBS CUBE
THE POSITION OF THE STOP IS ADJUSTED UNTIL BOTH ALIGNMENT TARGETS ARE IN FOCUS

PATHLENGTH MATCHED BEAM SPLITTER AND METHOD AND APPARATUS FOR ASSEMBLY

CROSS REFERENCE TO RELATED APPLICATIONS AND CLAIM OF PRIORITY

This invention claims priority to the following co-pending U.S. provisional patent application, which is incorporated herein by reference, in its entirety:

Detro, Provisional Application Ser. No. 60/349,273, entitled "A Means of Assembling a "Pathlength Matched" PBS Cube,", filed, Jan. 14, 2002.

This application also makes reference to Detro et al., U.S. patent application Ser. No. 10/202,595, entitled "METHOD AND LIGHT MANAGEMENT SYSTEM,", filed Jul. 24, 2002, the contents of which are incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to the assembly of a Beam Splitting cube and to a Polarizing Beam Splitter (PBS) cube. The present invention includes tooling and procedures that allow the assembly of PBS in which the "pathlengths" of light through the PBS are matched. The present invention provides inexpensive methods and procedures to implement pathlength matched PBS construction in high volume manufacturing environments.

2. Discussion of Background

The concept of pathlength matching is illustrated in FIG. 1 (Path 1=Path 2) in a Beam Splitting Cube 100. Beam Splitting Cube 100 is constructed of 2 optical components, an upper prism 105 and a lower prism 110. The prisms 105 and 110 are joined at a common diagonal 115. The PBS 100 has 2 illustrated paths, path 1 from a Face 1 of prism 105 to a Reference face of prism 105, and, path 2 from a Face 2 of prism 110 to the Reference face of prism 105. The illustrated paths are physical pathlengths that are substantially equal (ideally, to be exactly equal, these paths would also be on top of each other on the horizontal portion of the paths through prism 105). Hence, optical pathlengths at a given wavelength along the same paths are also substantially equal. As noted above, commercial PBS's are not usually pathlength matched. This is due to the fact that most individual prisms are not produced to a high physical tolerance and that variations are not normally accommodated in the PBS assembly process. Next, note that there are applications that use various pathlengths through an optical assembly (a PBS being one example) be matched. One example of such an optical assembly is disclosed in the above-referenced patent application entitled "METHOD AND APPARATUS FOR CONFIGURATION AND ASSEMBLY OF A VIDEO PROJECTION LIGHT MANAGEMENT SYSTEM." However, this and other optical assemblies generally require costly PBS production techniques.

In the past, two different methods have been used to produce pathlength matched PBS.

The first method is to measure the dimensions of all prism components and to sort them into groups having identical dimensions. Only prisms drawn from the same group would be mated. This method can produce a pathlength matched PBS but requires the additional labor associated with the measurements and provides additional opportunity to damage delicate prism surfaces. In addition, implementation of this method requires maintaining a substantial inventory of prism components to support high volume PBS manufacturing.

The second method is to measure the physical dimensions of the PBS during the assembly process. Then, the dimensions of the PBS are modified by adjusting a thickness of the glue line. The glue line is along the diagonal of the two prisms. In practice, this fabrication method is found to be slow, require considerable operator skill, and provides a poor yield.

SUMMARY OF THE INVENTION

The present inventors have realized that production of pathlength matched PBSs can be more economically produced by matching the optical path of prism components used in constructing the pathlength matched PBSs. The inventions disclosed herein are an improvement for assembling a pathlength matched PBS. The improvements are fast, require little operator skill and are high yielding. As a consequence, the improved means are inexpensive and appropriate for high volume production.

In one embodiment, the present invention provides a method of constructing a pathlength matched optical device, comprising the steps of, inserting an adhesive between at least two components of an optical device, adjusting positions of the components until their relative positions form a pathlength matched position, and curing the adhesive between the components while the components are held in the pathlength matched position.

In another embodiment, the present invention provides a device, comprising, a first precision holding device configured to hold a first prism and place a first alignment target adjacent to a face of the first prism, a second precision holding device configured to hold a second prism such that a diagonal of the second prism is parallel to a diagonal of the first prism and to place a second alignment target adjacent to a face of the second prism, an adjustment device configured to adjust relative positions of the first and second holding devices, and a lens configured to observe a first light path originating at the first alignment target and a second light path originating at the second alignment target.

Portions of both the device and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire (s), fiber optic cable(s), and coax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2B:
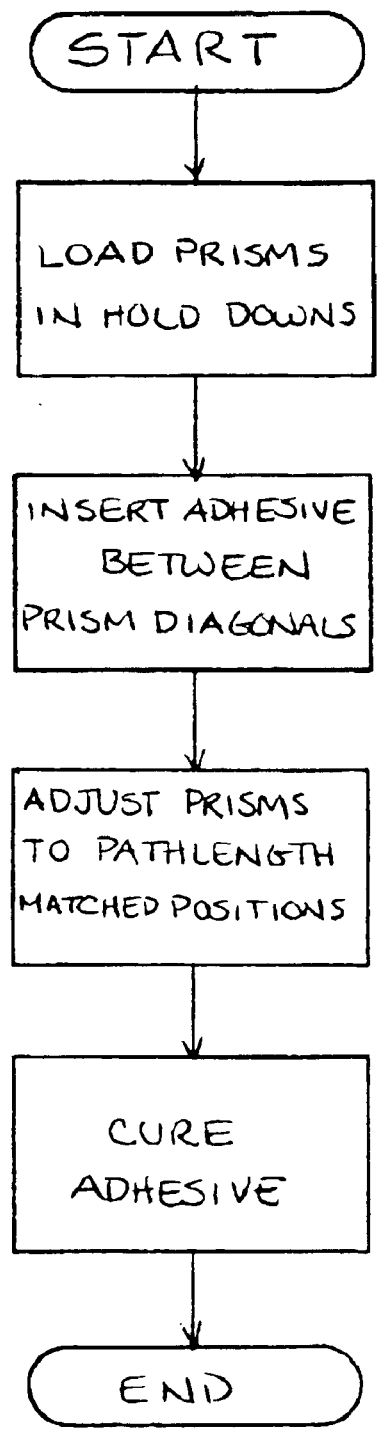
FIG. 2B is a flow chart of a process for producing a pathlength matched beamsplitter.
Figure 2A:
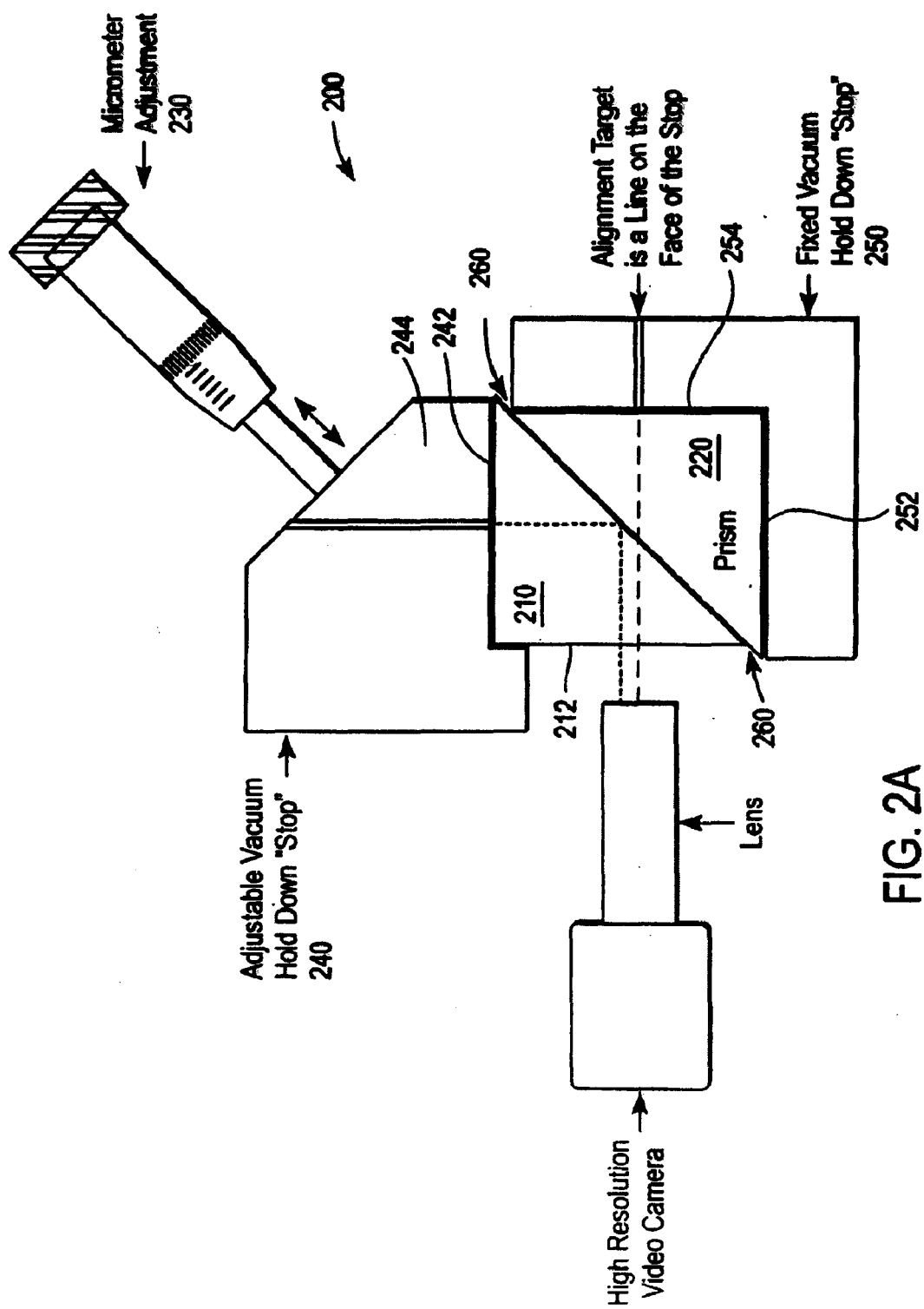
FIG. 2A is an illustration of a device used to produce a pathlength matched PBS cube according to an embodiment of the present invention.
Figure 2B:
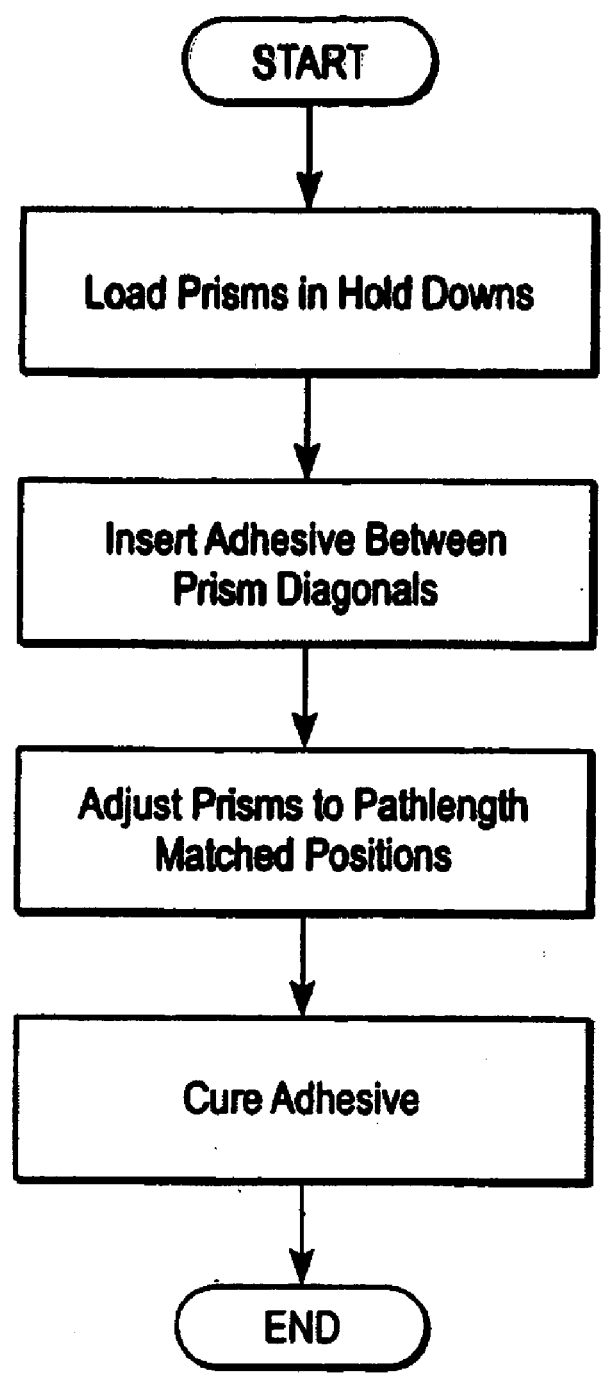

Referring again to the drawings, wherein like reference numerals designate identical or corresponding parts, and more particularly to FIG. 2 thereof, there is illustrated a pathlength matching device 200 used to produce a pathlength matched PBS or beam splitting cube. A production process of a pathlength matched PBS cube is now described.

The pathlength matching device 200 is configured to hold two prisms (e.g., prism 210 and 220) and provide a fine adjustment (e.g. micrometer adjustment 230) for aligning or matching selected pathlengths through the two prisms. The two prisms (210 and 220) that will compose a PBS upon completion of the production process are positioned onto precision "stops" (240, 250) of the pathlength matching device 200. Using the terminology defined in FIG. 1, Face 1 (on the top prism 210) is attached to the adjustable stop 240 along side 242, and Face 2 (on the side of prism 220) is attached to the fixed stop 220 along side 252.

One method to achieve a firm but temporary attachment of the prisms to the stops is to use a vacuum hold down. For example, a vacuum chuck (not shown) is placed in at least one location on each stop and a vacuum line attached to the chucks provides suction that holds the prisms in place. However, other devices such as a clamp may be utilized. Thus the prisms are placed in position in corresponding stops of the pathlength matching device.

An adhesive (e.g., a UV curable adhesive) is dispensed to fill the gap between the top and bottom prism. On the face of each stop is a precisely located alignment target. The alignment target is a fine line (on the order of 10 microns). Stop 240 includes alignment target 244 and stop 250 includes alignment target 254. A high-resolution video camera "looks into" the as yet unassembled PBS through a Reference Face 212 of prism 210. Both alignment lines are observed through the video camera. Pathlength matching is achieved when the two alignment lines coincide. The lines can be made coincident by "sliding" the top prism along diagonal 260 between the top prism 210 and the bottom prism 220.

The amount of adjustment is performed by visually viewing and adjusting the prism assembly. With experience, an assembler will be able to estimate an amount of adjustment and dial that amount into the micrometer, and then perhaps make one or two smaller adjustments to position the prisms in a pathlength matched position. However, knowledge of a precise number to dial into the micrometer is not essential, and the pathlength matched positions can be reached simply by viewing and adjusting. Therefore, the micrometer 230 may be replaced by a fine adjustment screw or any device that can be configured to move the relative positions of the two prisms along their diagonals.

Also, note that the pathlength adjustment is fine tuned by sliding the prisms along their diagonals, and since the prisms are generally not of precisely the same dimensions, the prism corners will not perfectly align (note overhand at each end of the diagonals). In the finished pathlength matched beamsplitter (e.g., PBS), the amount of overhang is proportional to an amount of non-uniformity, or non-equality, in the dimensions of the prisms. With uniform prisms having equal dimensions, the prisms would mate together evenly, however, as noted above, such precision in prism construction is very costly. Thus, the present invention allows pathlength matched construction without the need for precisely sized prisms.

In the embodiment of FIG. 2, a micrometer 230 is utilized to adjust the position of the top prism and make the alignment lines coincide. In one embodiment, an operator watches an output of the video camera on a display screen and manually turns the micrometer adjustment until the alignment targets coincide. In another embodiment, the video camera feeds a computing device having vision system software that recognizes when the alignment targets are aligned. Computer generated signals inform an operator how much to adjust the micrometer, or the micrometer is adjusted by a stepping motor (or other control motor) as commanded by the vision system. In another embodiment, the video camera is replaced with an eyepiece in which the operator directly observes the alignment targets and then manually adjusts the micrometer 230.

Finally, once alignment is satisfactory, a UV lamp is used to illuminate the PBS curing the adhesive and locking the components into place. An entire process for producing a pathlength matched beam splitting cube, using the device shown in FIG. 2A, is illustrated in FIG. 2B. To produce a Polarizing Beam Splitter (PBS) an additional step of applying a polarizing layer, thin film, to a diagonal of one of the prisms or between each of the diagonals of the prisms is added. Other types of beam splitters may be constructed by adding or substituting a different thin film (e.g., colorized beam splitter with the addition of a color layer).

Figure 3:
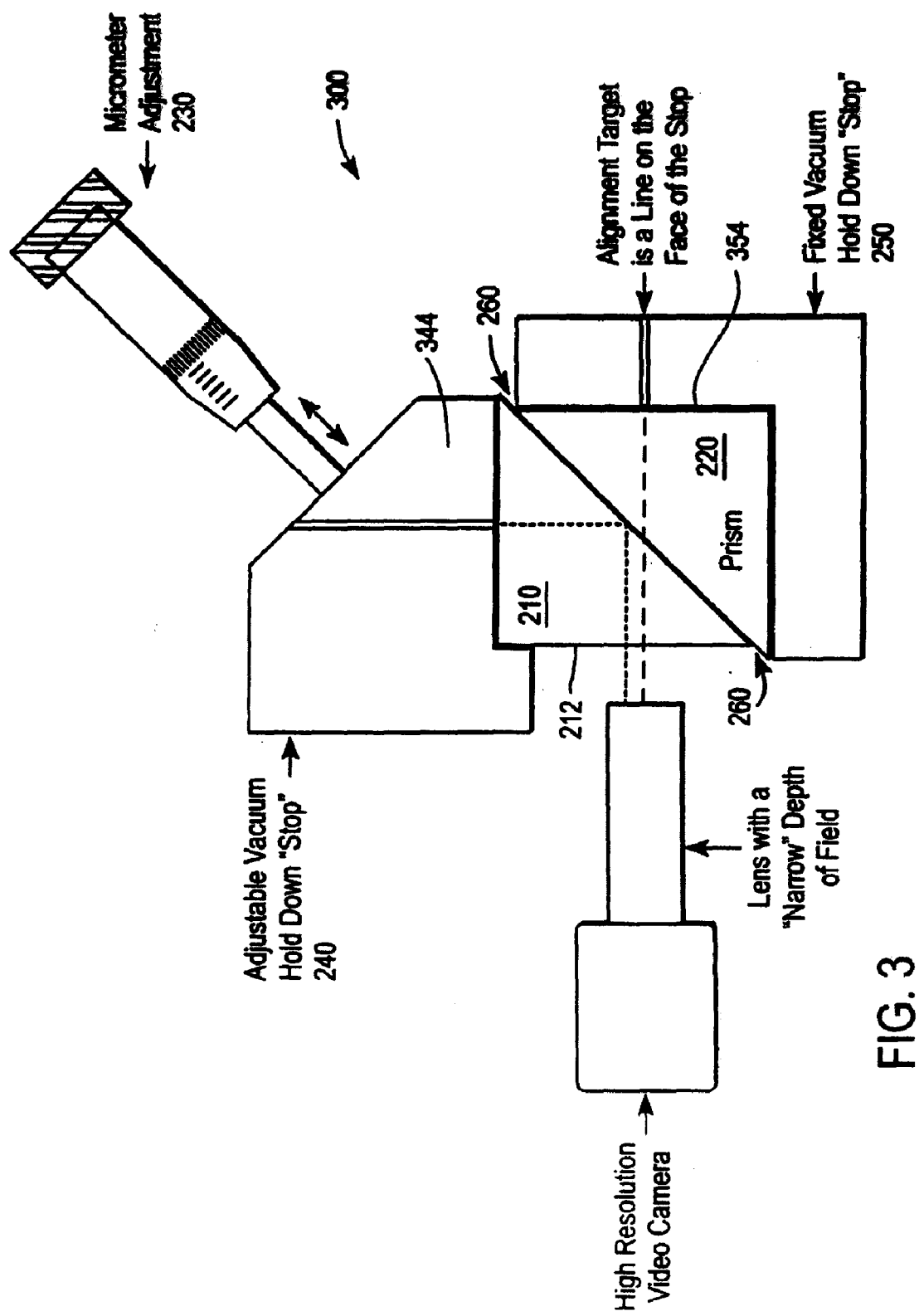
FIG. 3 is an illustration of a device used to produce a pathlength matched PBS cube according to another embodiment of the present invention.

A second method of production of a pathlength matched PBS cube is now described. FIG. 3 is an illustration of a device used to produce a pathlength matched PBS cube according to another embodiment of the present invention. Several features of the device in FIG. 3 are the same as the device in FIG. 2. The two prisms that will compose the PBS are held onto precision stops 240 and 250. Face 1 (on the top prism 210) is attached to the adjustable stop 240 and Face 2 (on the bottom prism 220) is attached to the fixed stop 250. Again, a vacuum hold down is used to achieve a firm but temporary attachment of the prisms to the stops. As before, an adhesive (probably an UV adhesive) is dispensed to fill a gap between the top and bottom prism along diagonal 260.

An alignment target is located on the face of each stop. In this embodiment, the location of the alignment target need not be precise. A high-resolution video camera "looks into" the as yet unassembled PBS through the Reference Face 212 (of the top prism 210). In this embodiment, the depth of field (DOF) of the video camera (as determine by the lens) is chosen to be very limited. The position of the top prism is adjusted by micrometer 230 until the video camera has both alignment targets simultaneously in focus. An equal distance (matched pathlength) from both alignment targets to the reference face (and video camera focal plane) is achieved when both alignment targets are in focus. DOF of the video camera is limited such that the alignment targets can only be simultaneously in focus when the prisms are arranged in a pathlength matched position within a tolerance needed for a product in which the PBS is to be used. As before, when alignment is satisfactory, the final step is to use a UV lamp to illuminate the PBS and cure the adhesive.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing an alignment target as a fine line, other targets, such as circles, cross hairs, etc, may be substituted. Also, any of the mechanical or optical components such as a micrometer, stops, video cameras, lenses, etc., may also be substituted with an equivalent device, or another device having an equivalent function or capability, whether or not listed herein. Furthermore, the inventors recognize that newly developed technologies not now known may also be substituted for the described parts and still not depart from the scope of the present invention.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMS, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Data used by the software may be retrieved from different sources (local or remote) and either permanently or temporarily stored (before, during, or after any processing) by utilizing any of text files, delimited files, database(s), or other storage techniques. Ultimately, such computer readable media further includes software for performing at least part of the present invention as described above.

Included in the programming (software) of the general/specialized computer or microprocessor are software modules for implementing the teachings of the present invention, including, but not limited to, recognition of alignment of alignment marks, sending adjustment signals that are any of printed or displayed, audible, or in command form sent to an adjustment micrometer, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A beam splitting device, comprising:

a first prism;

a second prism abutted to the first prism along diagonals of the first and second prisms; and wherein:

the first prism and the second prism overhang at least one corner at the diagonals; and the beam splitting device comprises a pathlength matched beam splitting device.

2. A pathlength matched beam splitting device, comprising:

a first prism;

a second prism abutted to the first prism along diagonals of the first and second prisms; and wherein:

the first prism and the second prism overhang at least one corner at the diagonals; and said overhang is directly proportional to an amount of non-uniformity between the first and second prisms.

3. A beam splitter, comprising a first prism comprising a first diagonal surface and a beam splitting layer disposed on the diagonal surface;

a second prism comprising a second diagonal surface; and a fixing mechanism configured to fix the first diagonal surface parallel to the second diagonal surface;

wherein the first prism and the second prism are of unequal proportions and are fixed in pathlength matched positions.

4. The beam splitter according to claim 3, wherein:

the beamsplitter comprises an input face, a first exit face, and a second exit face; and the beamsplitter is configured such that light beams entering the input face are split by the beam splitting layer into a first split light beam exiting the first exit face and a second split light beam exiting the second exit face, and portions of the split light beams corresponding to a same input light beam travel equivalent distances between the beam splitting layer and the respective exit faces.

5. The beam splitter according to claim 3, wherein the fixing mechanism comprises an adhesive layer between the beam splitting layer and the diagonal surface of the second prism.

6. The beam splitter according to claim 5, wherein the adhesive comprises an optical adhesive.

7. The beam splitter according to claim 5, wherein the adhesive comprises a UV cured adhesive.

8. The beam splitter according to claim 3, wherein the fixed positions of the prisms result in an amount of overhang at the diagonals.

9. The beam splitter according to claim 3, wherein the fixed positions of the prisms result in an amount of overhang at the diagonals, and, the amount of overhang is related to the unequal proportions of the first prism and the second prism.

10. The beam splitter according to claim 3, wherein the fixing mechanism comprises a clamp.

11. The beam splitter according to claim 10, further comprising a beam splitting layer disposed on a surface of the first prism.

12. A beam splitter, comprising:

a first prism having a first set of dimensions; and a second prism having a second set of dimensions;

wherein the first prism and the second prism are set in pathlength matched positions;

wherein the first prism comprises a first diagonal surface upon which a beam splitting layer is disposed.

13. The beam splitter according to claim 12, wherein:

the second prism comprises a second diagonal surface; and the first and second prisms are set such that the first diagonal surface and the second diagonal surface are parallel.

14. The beam splitter according to claim 12, further comprising an adhesive layer disposed between the first diagonal surface and second diagonal surface.

15. The beam splitter according to claim 12, further comprising an adhesive layer disposed between the first and second prisms.

16. The beam splitter according to claim 12, wherein the beamsplitting layer comprises one of a color layer and a polarizing beam splitting layer.

17. A polarizing beam splitter, comprising:

a first prism comprising a diagonal surface;

a polarizing beam splitting layer disposed on the diagonal surface of the first prism;

a second prism having dimensions different from the first prism and comprising a second diagonal surface;

wherein:

the second prism is fixed in a position such that the second diagonal surface is parallel to the diagonal surface of the first prism; and the beam splitter comprises an input face, a first exit face, and a second exit face, the faces are configured such that a single light beam entering the input face is split into a first split light beam that exits the first exit face and a second light beam that exits the second exit face, and distances traveled within the beam splitter by the first split light beam and the second split light beam are equivalent.

18. The polarizing beam splitter according to claim 17, wherein an amount of difference in the dimensions of the prisms results in an amount of overhang between the two prisms that is proportional to the difference in dimensions of the prisms.

19. A beam splitting device, comprising:

a first prism; and a second prism abutted to the first prism along diagonals of the first and second prisms; and a beam splitting layer disposed between the diagonals;

wherein the prisms are abutted in positions that configure the beam splitting device as a pathlength matched beamsplitter.

20. The beam splitter according to claim 19, wherein the beam splitting layer is a polarizing beam splitting layer.

21. The beam splitter according to claim 19, wherein the beam splitting layer is a polarizing beam splitting thin film.

22. The beam splitter according to claim 19 wherein the beam splitting layer is a color layer.

23. The beam splitter according to claim 19, further comprising an adhesive layer disposed between the diagonals.

24. The beam splitter according to claim 19, wherein at least one of the prisms is triangular shaped.

25. The beam splitter according to claim 19, wherein both of the prisms are triangular shaped.

26. The beam splitter according to claim 19, wherein the diagonals overlap.

27. The beam splitter according to claim 26, wherein an amount of the overlap is proportional to an amount of non-uniformity between the first and second prisms.

* * * * *

UNITED STATES PATENT AND TRADEMARK OFFICE
CERTIFICATE OF CORRECTION

PATENT NO.       : 6,809,874 B1
APPLICATION NO. : 10/251225
DATED            : October 26, 2004
INVENTOR(S)      : Detro It is certified that error appears in the above-identified patent and that said Letters Patent is hereby corrected as shown below:

THE TITLE PAGE, SHOWING AN ISSUSTRATIVE FIGURE, SHOULD BE DELETED AND SUBSTITURE THEREFOR THE ATTACHED TITLE PAGE.

Figure 1:
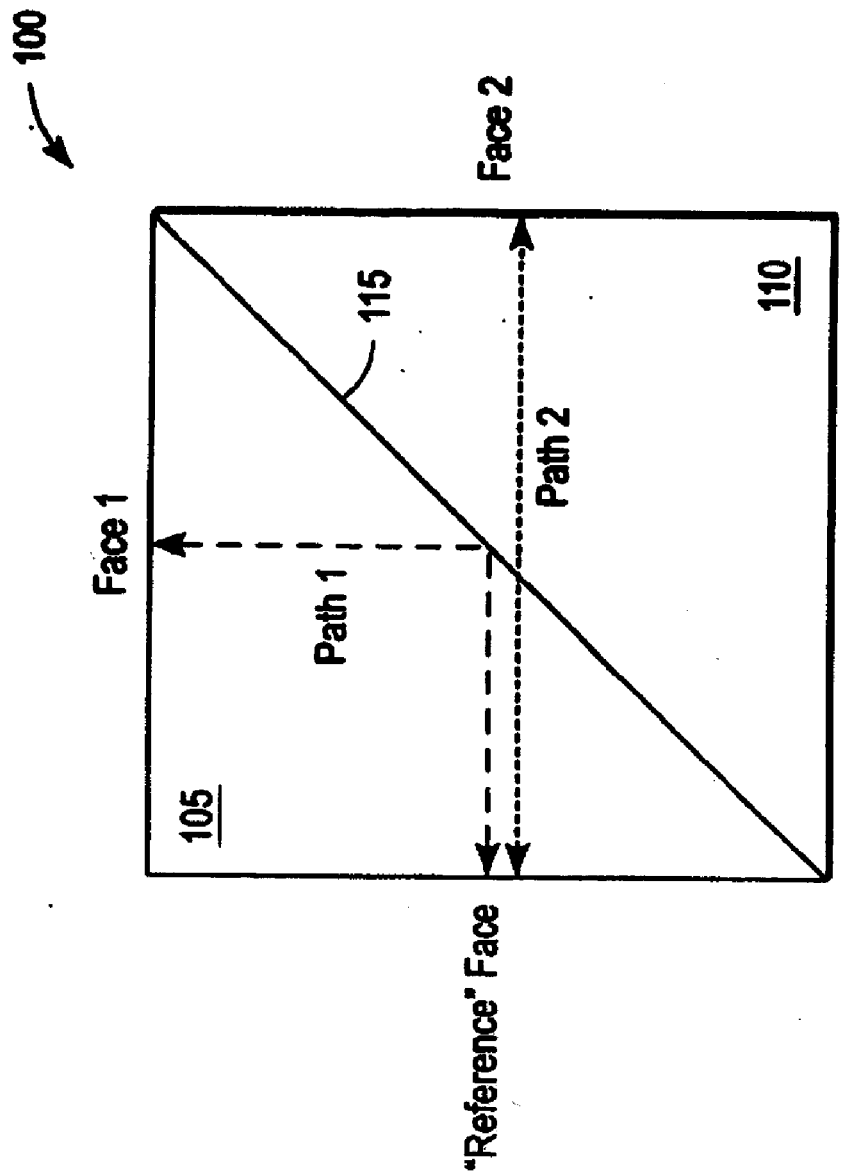
FIG. 1 is an illustration of a pathlength matched Polarizing Beam Splitter (PBS) cube.

DELETE DRAWING SHEETS 1-4 AND SUBSTITUTE THEREFOR THE DRAWING SHEET CONSISTING OF FIG 1-3 AS SHOWN ON THE ATACHED PAGES.

Signed and Sealed this

Eighteenth Day of July, 2006

JON W. DUDAS
*Director of the United States Patent and Trademark Office*